(12) United States Patent
Weigle (10) Patent No.: US 7,783,739 B1
(45) Date of Patent: Aug. 24, 2010

(54) HIGH-SPEED AND HIGH-FIDELITY SYSTEM AND METHOD FOR COLLECTING NETWORK TRAFFIC

(75) Inventor: Eric H. Weigle, Los Alamos, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 1436 days.

(21) Appl. No.: 10/393,264

(22) Filed: Mar. 21, 2003

(51) Int. Cl.
G06F 15/177 (2006.01)
G06F 15/173 (2006.01)
H04L 1/00 (2006.01)
G02B 6/00 (2006.01)
G02B 6/42 (2006.01)

(52) U.S. Cl. .................. 709/224; 709/220; 370/253; 385/11; 385/48

(58) Field of Classification Search ............ 709/224, 709/220, 203; 370/253; 385/11, 48
See application file for complete search history.

(56) References Cited

U.S. PATENT DOCUMENTS

| | | | | |
|---|---|---|---|---|
| 5,673,142 | A * | 9/1997 | Fatehi et al. | 359/341.41 |
| 5,787,253 | A * | 7/1998 | McCreery et al. | 709/231 |
| 5,958,010 | A * | 9/1999 | Agarwal et al. | 709/224 |
| 6,160,651 | A * | 12/2000 | Chang et al. | 398/79 |
| 6,374,307 | B1 * | 4/2002 | Ristau et al. | 709/249 |
| 6,467,041 | B1 * | 10/2002 | Blam | 709/227 |
| 6,510,257 | B1 * | 1/2003 | Barwicz et al. | 385/11 |
| 6,675,218 | B1 * | 1/2004 | Mahler et al. | 709/230 |
| 6,845,197 | B2 * | 1/2005 | Lam et al. | 385/48 |
| 6,975,617 | B2 * | 12/2005 | Walker et al. | 370/349 |
| 7,246,101 | B2 * | 7/2007 | Fu et al. | 706/46 |
| 7,437,451 | B2 * | 10/2008 | Tang et al. | 709/224 |
| 7,543,051 | B2 * | 6/2009 | Greifeneder et al. | 709/224 |
| 2002/0131369 | A1 * | 9/2002 | Hasegawa et al. | 370/241 |
| 2003/0110394 | A1 * | 6/2003 | Sharp et al. | 713/200 |
| 2003/0131098 | A1 * | 7/2003 | Huntington et al. | 709/224 |
| 2003/0140130 | A1 * | 7/2003 | Evrard et al. | 709/223 |
| 2004/0120259 | A1 * | 6/2004 | Jones et al. | 370/250 |

OTHER PUBLICATIONS

E. Weigle et al., "Ticketing High-Speed Traffic with Commodity Hardware and Software," 2002.

* cited by examiner

*Primary Examiner*—Kevin Bates
(74) *Attorney, Agent, or Firm*—Thomas S. O'Dwyer; James C. Durkis (57) ABSTRACT

A system is provided for the high-speed and high-fidelity collection of network traffic. The system can collect traffic at gigabit-per-second (Gbps) speeds, scale to terabit-per-second (Tbps) speeds, and support additional functions such as real-time network intrusion detection. The present system uses a dedicated operating system for traffic collection to maximize efficiency, scalability, and performance. A scalable infrastructure and apparatus for the present system is provided by splitting the work performed on one host onto multiple hosts. The present system simultaneously addresses the issues of scalability, performance, cost, and adaptability with respect to network monitoring, collection, and other network tasks. In addition to high-speed and high-fidelity network collection, the present system provides a flexible infrastructure to perform virtually any function at high speeds such as real-time network intrusion detection and wide-area network emulation for research purposes.

18 Claims, 5 Drawing Sheets

HIGH-SPEED AND HIGH-FIDELITY SYSTEM AND METHOD FOR COLLECTING NETWORK TRAFFIC

GOVERNMENT RIGHTS

The United States Government has rights in this invention pursuant to Contract No. W-7405-ENG-36 between the United States Department of Energy and the University of California for the management and operation of Los Alamos National Laboratory.

FIELD OF THE INVENTION

The present invention generally relates to computer communication networks, and more particularly to collecting high-resolution information about all traffic traversing a single network link. Specifically, this invention pertains to a system for high-speed high-accuracy capture of network traffic that combines efficient commodity-based hardware in an architecture that hides disk latency and bandwidth.

BACKGROUND OF THE INVENTION

Computer networks are becoming an integral part of daily lives through technologies such as the Internet, wireless personal digital assistants, ad-hoc wireless and mobile networks. The potential for using these networks to assist in illegal or terrorist-based activities is very large. The ability to monitor network traffic and police computer networks is critically important.

Network speeds have been increasing at an incredible rate, doubling every 3-12 months. This is even faster than one version of the remarkably accurate "Moore's Law" observation made in 1965 that states that processing power doubles every 18-24 months. However, while network speeds have been increasing exponentially, disk and bus bandwidth have only increased linearly. The disparity between network, CPU, and disk speeds will continue to increase problematically. Most analysts agree that there are enough new manufacturing methods, designs, and physics available in the near future that these trends will continue for some years to come. One issue fueling this trend is that networks are increasingly optical while computers are primarily electronic.

The implications of these trends are critically important. Conventional methods will not suffice to capture network traffic in the future. As research technology becomes conventional technology, tcpdump/libpcap style processing will have neither the requisite processing power nor the disk bandwidth available to handle fully saturated network links. Any such single-machine design, no matter how well implemented, will be unable to "keep up" with the network. For example, field tests of tcpdump/libpcap running on a 400-MHz machine over a Gigabit Ethernet (GigE) backbone showed that tcpdump could monitor traffic at speeds of no more than 250 Mbps with accuracy of no greater than milliseconds. At times of high network utilization (e.g., approximately 85%), over half of the packets were lost because this system could not handle the load. In addition, because few network traffic monitoring systems are available, many vendors offer custom hardware solutions with proprietary software. These systems are very expensive.

It is possible to address disk and accessory bandwidth by using redundant arrays of independent disks (RAID) systems as network-attached storage (NAS) and the memory integrated network interface (MINI) paradigm, but both systems are currently somewhat expensive. Memory bandwidth issues have been addressed by dynamic random access memory chip technology such as RAMBUS or simple increases of processor cache size, but these techniques have failed to live up to their potential. These approaches in combination with highly tuned commercial-off-the-shelf (COTS) monitors and a specialty monitor have been tested. Unfortunately, this approach is expensive and still susceptible to the growing disparity between network, CPU, and disk speeds.

Most limitations in current network monitoring methodologies are due to compromises in scalability, user level versus kernel level tasks, and monitor reliability. They compromise scalability by forcing the use of a single machine or processor rather than symmetric multiprocessing (SMP) or cluster systems. However, at projected network speeds the collection task for a single machine can require so much processing power that too little remains to actually do anything useful with the data.

The user level/kernel level compromise gives up efficiency, real-time monitoring, and timer resolution for ease of use. Most currently available network monitoring approaches are user level applications tied to their operating system's performance; these approaches depend upon system calls such as gettimeofday( ). Conversely, a dedicated operating system (OS) operates at kernel level and uses lower-level hardware calls such as rdtsc( ) (read-time stamp counter).

Reliability compromises are a misguided attempt to reduce cost but introduce issues with many implementations that fail to keep up with network speeds, fail to maintain a count of dropped packets, crash or hang during use.

The performance of currently available network traffic monitoring systems can be illustrated by tcpdump, libpcap, and remote monitoring (RMON) systems. Tcpdump is an invaluable, easy-to-use, portable, free tool for network administrators. It is designed as a user interface application relying upon functionality contained in the lower-level libpcap library, which has also been successfully used with other applications. Unfortunately, by nature tcpdump and libpcap have limitations due to decisions made concerning the compromises previously discussed. In particular, libpcap executes on a single machine, uses system calls to perform timestamps, and can be unreliable.

Furthermore, libpcap suffers from efficiency problems pandemic to implementations of traffic collection at user level. The operating system performs the required packet copy in the network stack (for transparency); this can double the time required to process a packet. The exact method used by libpcap and other tools varies by operating system but always involves a context switch into kernel mode and a copy of memory from the kernel to the user level library. This "call-and-copy" approach is repeated for every packet observed in Linux (or other operating systems), while other implementations use a ring buffer in an attempt to amortize costs over multiple packets. At high network speeds, the overhead of copying each individual packet between kernel and user space becomes so excessive that as much as 50% of the aggregate network traffic is dropped when using tcpdump/libpcap over a gigabit Ethernet link.

Remote monitoring (RMON) devices contain some traffic-collection functionality as well as some management functionality. These devices provide a superset of the functionality of tcpdump/libpcap but work in much the same way. Although the management software provides a nice interface to the hardware RMON device, it also introduces substantial overhead that limits the fidelity of packet timestamps to the order of seconds. This fidelity is a thousand times worse than tcpdump. RMON devices have several additional limitations.

First, the packet-capture mode of the RMON device often silently drops packets. Second, the data-transfer mode of the RMON device requires an active polling mechanism from another host to pull data across. Finally, the RMON devices themselves hang or crash often, e.g., every 36-72 hours.

Thus, there is need for a new, specialized network traffic monitoring methodology that is scalable, efficient, reliable, and inexpensive. The need for such a system has heretofore remained unsatisfied.

SUMMARY OF THE INVENTION

The present invention satisfies this need, and presents a system and associated method for collecting high-speed network traffic. The present system simultaneously addresses the issues of scalability, performance, cost, and adaptability with respect to network monitoring, collection, and other network tasks. The present system scales to gigabit-per-second (Gbps) speeds and achieves these speeds while taking measurements that are up to nine orders of magnitude more accurate than commercial offerings and up to two orders of magnitude less expensive than commercial offerings. In addition to network monitoring, the present system can also be configured as a real-time network intrusion detection system or a wide-area network emulator.

The methodology and apparatus for the present system comprises two specially configured commodity parts: the operating system and the architecture/apparatus. The present system uses a dedicated operating system for traffic collection to maximize efficiency, scalability, and performance. This operating system operates as close to the hardware as possible and avoids running extraneous services that would compete with traffic collection for resources.

One feature of the present system is that the monitoring software runs entirely in kernel space. Consequently, no context switches are required and buffer copying is minimized, eliminating the need to copy data to/from kernel space to user space. In addition, the present system allows for variable packet-size capture and real-time processing of data. Another aspect of the present system utilizes the cycle-counter register to ensure high-fidelity timestamps. This approach to timestamping provides accuracy and precision that is thousands of times better than current state-of-the-art.

A scalable infrastructure and apparatus for the present system is provided by splitting the work performed on one host onto multiple hosts. The first host, or "packet monitor" captures packets, collects the relevant data from the packets, and forwards the collected packet data to multiple other hosts, or "data processors". The data processors either save, display, or process the data further such as required for intrusion detection.

This architectural separation allows tasks to be pipelined and handled concurrently. For instance, after the packet monitor captures, filters, and forwards data from the first packet, the packet monitor can then move onto a second packet. Meanwhile, the first packet is being processed by an data processor, e.g., recorded to disk. This parallel processing of packets multiplies the rate at which traffic can be recorded compared to present technology—doubling with two machines, tripling with three, and so forth.

Furthermore, to hide data processor limitations, such as the slow speed of disk writes, the present system can perform the disk writes to the data processors in parallel. For example, given a packet monitor and four data processors, a different packet can be processed by each of the data processors. The present system records four packets in parallel while the packet monitor captures a fifth packet. Such a scenario can theoretically increase the traffic-monitoring rate by a factor of five.

The present system performs as well or better than current commercial network collection systems at a fraction of the cost.

The present system can be used in any computing system that communicates over a network. Examples include high-performance computing environments, supercomputers, PC-computing clusters, Internet-based environments, web-server clusters, digital library clusters, institutional networks, Cyber-Security, and middleboxes or proxy servers. The Internet infrastructure can leverage the present system to perform monitoring and network intrusion detection among other tasks.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

API (application program interface): A specific method prescribed by a computer operating system or by another application program by which a programmer writing an application program can make requests of the operating system or another application.

DMA: (Direct Memory Access/Addressing) A method of transferring data from one memory area to another without having to go through the central processing unit.

Ethernet: The most common type of local area network, originally sending its communications through radio frequency signals carried by a coaxial cable at 1 Mbps. This cable was shared (hubbed) among many machines and each one could transmit over the link. The second and third generation used Category 5 twisted-pair copper cable, while today, the fourth-generation 10 Gigabit Ethernet uses optical fiber and is a point-to-point (switched) computer communication network. Network communication software protocols used with Ethernet systems vary, but include Novell Netware and TCP/IP.

IP: (Internet Protocol) The network layer protocol in the TCP/IP communications protocol suite (the "IP" in TCP/IP). IP contains a network address and allows routing of messages to a different network or subnet.

Kernel: The central part of an operating system that performs the most basic functions, such as coordinating use of computer memory (RAM), disks, or low-level network access.

Linux: An Open Source implementation of UNIX created by Linus Torvalds that runs on many different hardware platforms including Intel, Sparc®, PowerPC, and Alpha Processors.

PCI bus: (Peripheral Component Interconnect) A peripheral bus commonly used in PCs, Macintoshes and workstations. PCI provides a high-speed data path between the CPU and peripheral devices such as video, disk, network, etc.

RMON: (Remote MONitoring) Extensions to the Simple Network Management Protocol (SNMP) that provide comprehensive network monitoring capabilities. In standard SNMP, the device must be queried to obtain information. The RMON extensions allow proactive decisions; an administrator can set alarms on a variety of traffic conditions including specific types of errors.

SMP: Symmetric Multi-Processing. A computer system that has two or more processors connected in the same chassis, managed by one operating system, sharing the same memory, and having equal access to input/output devices. Application programs may run on any or all processors in the system; assignment of tasks is decided by the operating system. One advantage of SMP systems is scalability; additional processors can be added as needed.

TCP: Transmission Control Protocol. The most common Internet transport layer protocol, defined in STD 7, RFC 793. This communications protocol is used in networks that follow U.S. Department of Defense standards. It is based on the Internet Protocol as its underlying protocol; TCP/IP means Transmission Control Protocol over Internet Protocol. TCP is connection-oriented and stream-oriented, providing for reliable communication over packet-switched networks.

UDP: User Datagram Protocol. A communications protocol for the Internet network layer, transport layer, and session layer, which makes it possible to send a datagram message from one computer to an application running in another computer. Like TCP (Transmission Control Protocol), UDP is used with IP (the Internet Protocol). Unlike TCP, UDP is connectionless and does not guarantee reliable communication; the application itself must process any errors and check for reliable delivery.

Figure 1:
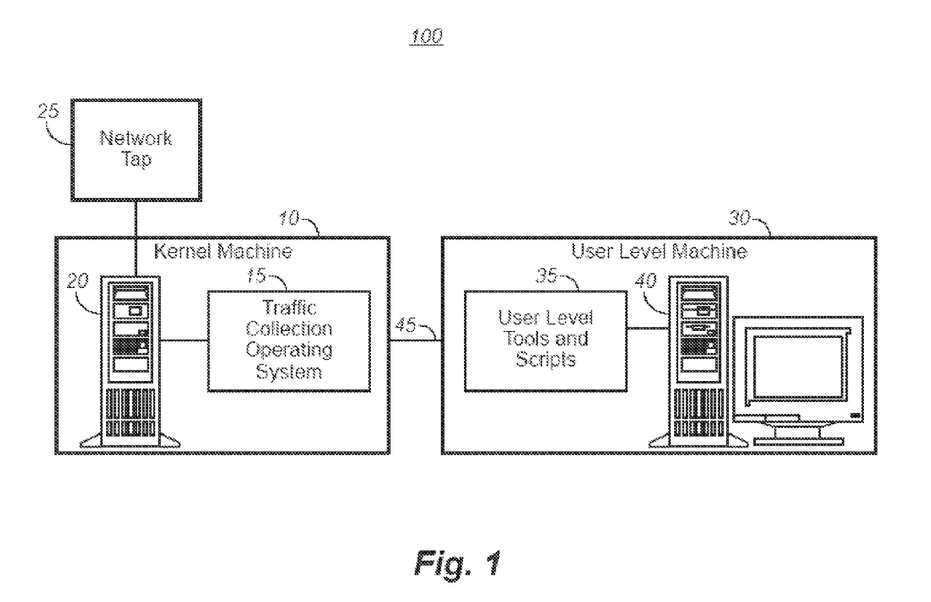
FIG. 1 is a schematic illustration of an exemplary operating environment in which a high-speed network traffic collecting system of the present invention can be used.

FIG. 1 illustrates an exemplary high-level architecture of a network traffic collection system 100 comprising a system 10 that utilizes a high-speed high-fidelity kernel machine. System 10 includes a software programming code or computer program product that is typically embedded within, or installed on a computer. Alternatively, system 10 can be saved on a suitable storage medium such as a diskette, a CD, a hard drive, or like devices.

System 100 comprises two parts, each running on separate hosts. The first part is system 10 comprising the highly efficient dedicated traffic collection operating system 15 installed on host computer 20 with network tap 25. The second part is the user level machine 30, comprising user level tools and scripts 35, installed on host computer 40. The user level machine(s) 30 further process, save, or display the collected traffic. A dedicated network link 45 connects the user level machine 30 with system 10.

System 10 uses kernel code running as close to the hardware as possible to maximize efficiency, scalability, and performance in critical areas. As a dedicated system, it avoids extraneous services competing for resources and decreasing security. Furthermore, running entirely in kernel space means that no context switches are required, and buffer copying is kept to a minimum, e.g., data no longer has to be copied from kernel space to user space. System 10 utilizes the cycle-counter register to provide high-fidelity timestamps with accuracy and precision thousands of times better than implementations of other approaches.

User level machine 30 maximizes usability and expressive power by performing less time-critical tasks such as saving to disk. The ability of the kernel level code in traffic collection operating system 15 to stripe across multiple user level machines makes efficiency less of an issue and enables complex analysis in real-time using clusters of machines.

Figure 2:
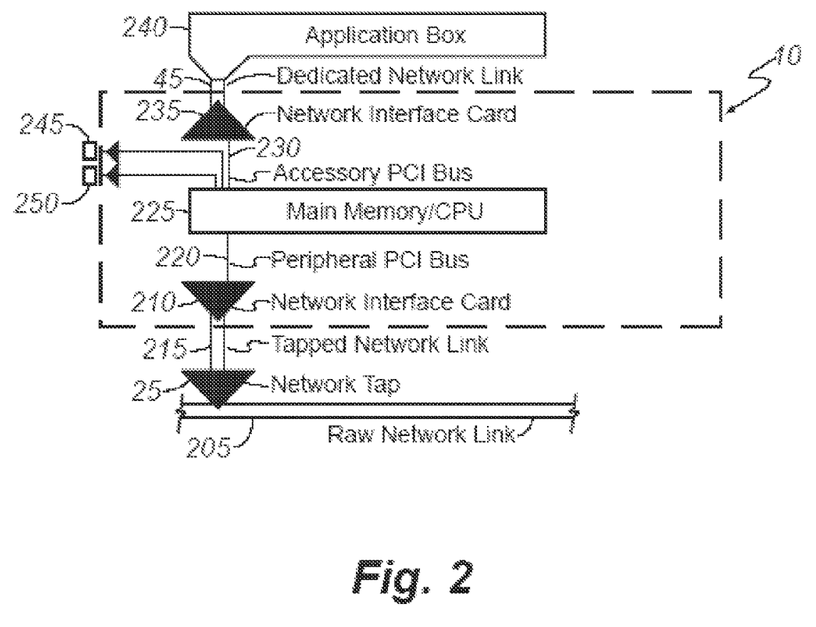
FIG. 2 is a diagram of the high-level architecture of the preferred embodiment of the high-speed network traffic collecting system of FIG. 1.

The high-level architecture of system 100 is shown in more detail in FIG. 2, presenting a logical view of the hardware configuration and the method for shared processing among multiple hosts. System 10 first collects traffic from the raw network link 205 via a network tap 25. The network interface card 210 then collects traffic from the tapped network link 215 and passes the data over the peripheral PCI bus 220 to the main memory/CPU 225.

The main memory/CPU 225 gathers the appropriate packet headers. These packet headers are passed back over the accessory PCI bus 230 and network interface card 235 onto a dedicated network link 45 to one or more data processors such as data processor 240, 245, 250, and so forth for display and/or storage.

System 10 comprises the network interface card 210, the peripheral PCI bus 220, the main memory/CPU 225, the accessory PCI bus 230 and the network interface card 235. Any on-board processor on the network interface card (NIC) 235 can be utilized by system 10 to provide even better performance.

With the adoption of a dedicated traffic collection operating system 15 for system 10, the display and storage of data traffic become the bottlenecks in traffic collection rather than first-level collection and analysis. To address those bottlenecks, system 10 is designed to have multiple, independent PCI busses and a motherboard with bandwidth capable of operating these buses concurrently at full speed. That is, the chipset does not become a new bottleneck as the prior bottleneck is removed.

Figure 3:
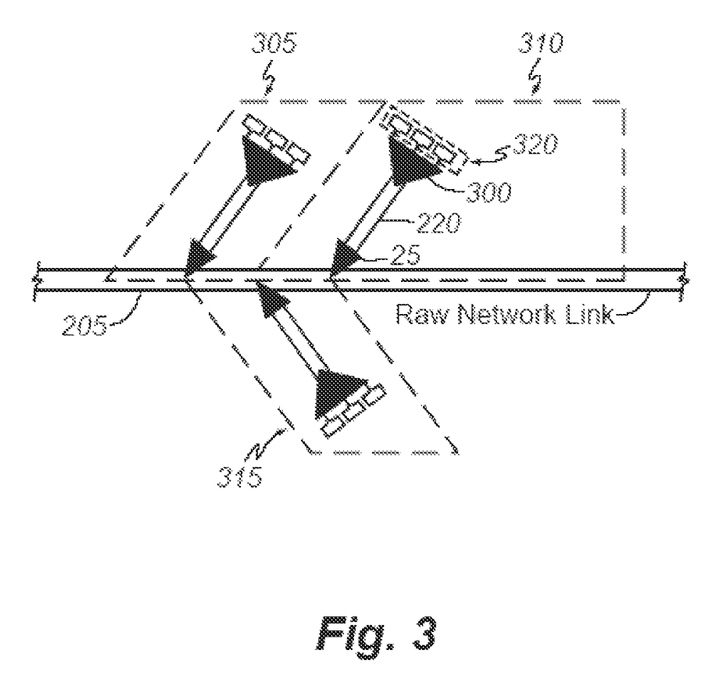
FIG. 3 is a diagram of high-level architecture of the second embodiment of the high-speed network traffic collecting system of FIG. 1.

The simplest configuration scales well beyond current techniques, but all the traffic still passes through a single host. To scale even further, e.g., 10 Gbps, the 64-bit/66-MHz PCI bus limitation of 4.2 Gbps must be avoided. A second embodiment of the present system is shown in FIG. 3, illustrating a configuration with multiple taps to reach even higher network speeds. System 300 is generally similar in design and function to system 10 with exception that network traffic collection configurations containing system 300 are duplicated and attached in parallel to the same raw network link 205, as shown by network traffic collection configurations 305, 310, 315. Packet headers are passed to one data processor 240 as shown in FIG. 2 or multiple data processors 320 as shown in FIG. 3.

Placing network traffic collection configurations 305, 310, 315 in parallel removes the requirement that all traffic move through a single host. However, this approach only works if the following conditions hold:

1. Each network tap 25 can be configured to split off only a given subset of traffic, or each network interface card 210 is capable of processing link-level packet headers at full link speed.

2. The union of the sets of traffic that systems 305, 310, 315 (and so forth) handle covers the original set of traffic.

3. There exists a globally synchronized clock.

The first condition is true when multiple wavelengths are used on a single optical fiber. Such a scenario is becoming more common as the cost of dense wavelength division multiplexing (DWDM) falls. In this case, each network tap 25 splits a single wavelength or set of wavelengths from the fiber in raw network link 205 for processing.

The second condition generally follows if the network tap 25 has been properly installed. Subsets of traffic collected by each system 300 need not be disjoint (although this is desirable); post-processing of the collected traffic can remove duplicates based on the collected headers and accurate timestamps.

The third condition can be addressed by the network time protocol (NTP). However, NTP only provides clock accuracy on the order of a millisecond. If data sets are not entirely disjoint (some packets with their associated timestamps are seen in multiple data sets) or if a hardware interface is dedicated solely to synchronization and management, then highly accurate synchronization can be provided.

The first and second embodiments of the present system focus on the use of commercially available hardware to perform network-monitoring tasks. However, the speed of core network links may outstrip commercially available hardware. For even faster network collection, a third embodiment connects the network tap 25 to a switch's uplink input. Switch hardware can then demultiplex the input to multiple copies of system 10 operating in parallel.

Figure 4:
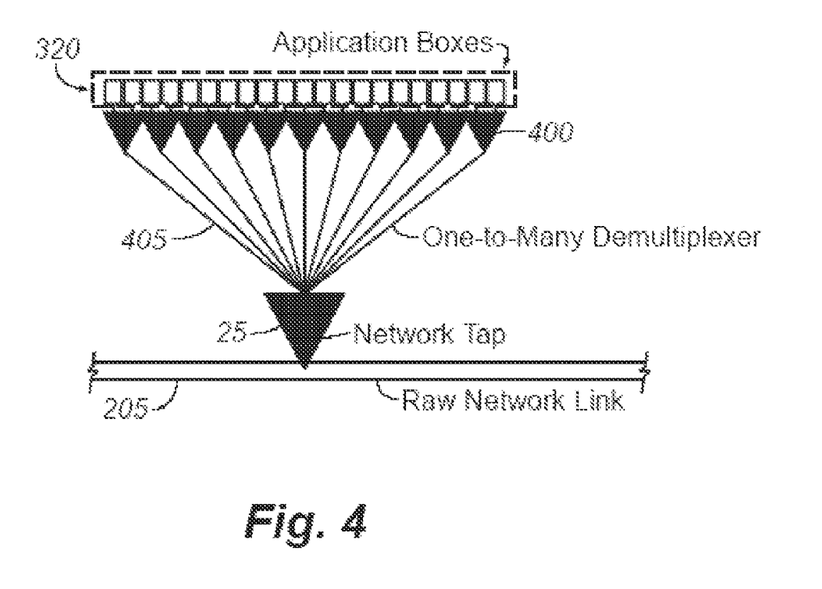
FIG. 4 is a diagram of high-level architecture of the third embodiment of the high-speed network traffic collecting system of FIG. 1.

FIG. 4 shows how system 400 might be implemented in hardware analogous to a network switch, possibly using a commercially available switch with predefined routes to appropriately split traffic. System 400 is generally similar in design and function to system 10 with the exception that instead of a switch uplink, network tap 25 copies traffic off raw network link 205. Instead of a true many-to-many switch fabric, the third embodiment requires only a simplified one-to-many demultiplexer 405.

The one-to-many demultiplexer 405 connects to lower-speed network links (just as a switch would) to which many copies of system 10 can be connected using port mirroring. Port or interface mirroring is a technique by which the traffic from one or more interfaces on a network switch (the mirrored interfaces) is copied to another port (the mirroring interface). This provides a mechanism to transparently observe traffic passing over the mirrored interfaces by observing traffic over the mirroring interface. Alternatively, simple chips could implement system 400 functionality and be integrated with this network traffic collection configuration, leaving only the data processors 320 separate.

While quite different from the tcpdump/libpcap style of collecting traffic, the architecture of the third embodiment is somewhat similar to the RMON specification. The third embodiment differs from RMON in two fundamental ways. First, system 400 pushes data to the data processors; using an RMON specification the data processors must poll the RMON device for data, i.e., pull the data from the RMON. Second, the individual network probe of the RMON is replaced in the third embodiment with an explicitly parallel methodology.

For current network speeds, system 10 of the first embodiment suffices for gigabit Ethernet. System 10 is implemented on Intel-based x86 hardware. The software portion of system 10 is derived from a Linux 2.4 kernel with the init( ) function replaced by code that implements the core functions of system 10. The invention may be implemented on any type of hardware (not only x86) that has a network link; similarly Linux was used only to minimize implementation time—the invention only requires a way to receive packets, process them, and send them.

This approach leverages a pre-existing code base for scheduler, virtual memory, device drivers, hardware probing, etc. This was done to minimize implementation time; the invention can be implemented with any operating system or hardware. The kernel for system 10 is the absolute minimum required to manage low-level hardware tasks and provide a useful application programming interface (API). The API of the stripped-down kernel is used to program system 10. Other implementations of system 10 may provide their own device drivers and memory handling to avoid the current use of Linux code.

Figure 5:
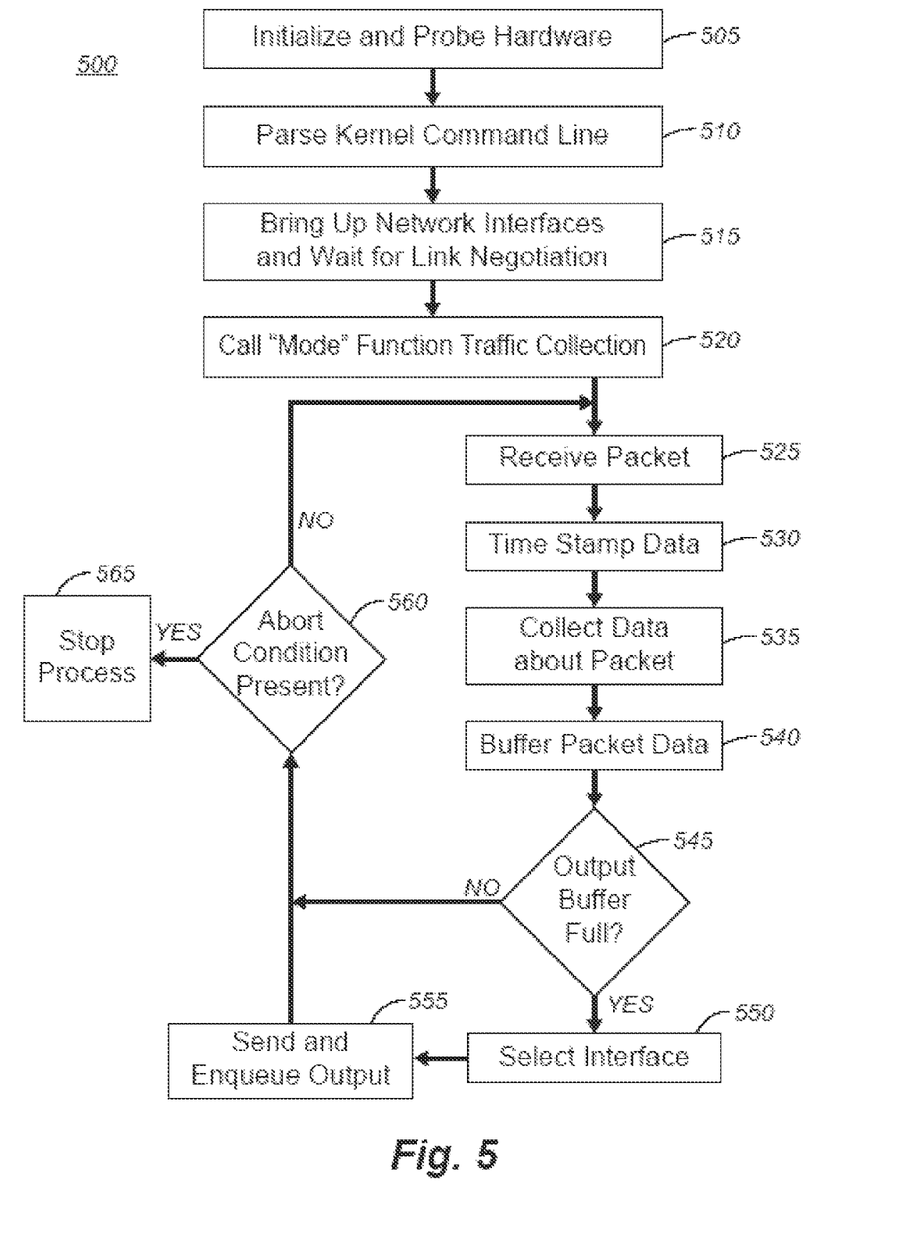
FIG. 5 is a process flow chart illustrating a method of operation of the high-speed network traffic collecting system of FIGS. 1 and 2.

The core sequence of events for any implementation of the method 500 of system 10 is described in the process flow chart of FIG. 5. At block 505, the kernel of system 10 initializes, probes hardware, and calls system 10 as the sole thread of execution. During the initial boot-up process, all the low level BIOS calls are performed by the kernel in system 10 before any traffic collection code is called. At block 510, system 10 parses the kernel command line for options. The ability to parse kernel command-line arguments allows system 10 to accept boot-time configuration information such as IP addresses or modes. System 10 then brings up network interfaces and waits for link negotiation at block 515. At block 520, system 10 calls a "mode" function; in this case, traffic collection. The "mode" function allows use of the framework of system 10 for performing related tasks such as network flooding for testing or for enabling "application layer" functionality that is logically separate from system 10.

System 10 then executes the following operations: receive a packet at block 525 and timestamp the packet at block 530. Timestamps are performed either as packets enter the network stack on the host main memory/CPU 225. This implicitly assumes that there is a fairly constant delay between packet arrival from the raw network link 215 and the time it enters the network stack via a DMA by the network interface card 235 and a host interrupt. Timestamps may also be performed by the network interface card 210.

System 10 collects information about the packet at block 535. This information includes the 64-bit timestamp, length "off-the-wire", and Ethernet information such as addresses of source and destination in addition to type of service or 802.3 length. System 10 also collects IP information such as addresses of source and destination, lengths of packet and header, and protocol number. TCP/UDP information collected by system 10 includes ports of source and destination in addition to length of UDP packet or TCP header. This information collected at block 535 is the minimal but most useful subset of data available. To check validity of packets, some redundancy is included with lengths. In practice, this information resolves to about 42 bytes of data per packet. Consequently, system 10 is collecting about 6.5% of the total traffic given a 650-byte average packet size. The type of information collected can be changed as required for various applications of system 10; for example whole packets may be collected, or simply the first 68 bytes to be analagous to tcpdump/libpcap.

The remaining data is sent to the user level host computer 35 for saving or further analysis. To minimize the overhead of sending packets on the outgoing link, system 10 buffers the results at block 540 until a packet is filled. System 10 verifies the status of the output buffer at block 545. If the output buffer is full, system 10 selects an interface at block 550. At block 555, system 10 enqueues the packet for sending; the device driver sends the packet asynchronously. For 42-byte data collection per input packet and 1500-byte Ethernet MTU, system 10 sends the results from about 34 input packets per output packet.

At decision block 560, system 10 verifies that the abort condition is not present. If ctrl-alt-del has been pressed or a specially formatted link-level "reboot" packet has been received by system 10, system 10 proceeds to block 565 and stops the network traffic collection process. Otherwise, system 10 returns to block 525 and repeats blocks 525 through 560 until the process is aborted. Since system 10 runs on general-purpose hardware, one could conceive of incurring security risks by placing such a machine on a network backbone. The passive nature of system 10 and the inability to modify parameters without a reboot currently addresses this problem.

It is to be understood that the specific embodiments of the invention that have been described are merely illustrative of certain application of the principle of the present invention. Numerous modifications may be made to the high-speed and high-fidelity system and method for collecting network traffic invention described herein without departing from the spirit and scope of the present invention.

What is claimed is:

1. A method for collecting high-speed network traffic, comprising:
    collecting traffic data from a raw network link via a plurality of network taps attached in parallel whereby each tap is configured to transfer a given subset of the total said network traffic;
    synchronizing said plurality of network taps using a global NTP clock;
    splitting at least one wavelength from the light source within the optical fiber so that each tap collects only the discrete stream of traffic associated with said at least one wavelength from said raw network link;
    passing collected data from a first network interface card over a peripheral PCI bus to a first level host processing unit;
    gathering certain packet information from the collected data; and
    transferring the remaining packet data from said host through at least one accessory PCI bus over an associated network interface card onto dedicated network communication links to one or more second level user processoring units for further analysis, display and storage.

2. The method of claim 1, wherein the light source within said optical fiber transmits network traffic by means of dense wavelength division multiplexing.

3. The method of claim 1, wherein each first level host processing unit comprises:
    a central processor, main memory, traffic collection operating system and motherboard with bandwidth capable of operating multiple independent accessory PCI busses concurrently at full speed.

4. The method of claim 3, further comprising using kernel code to initialize the computer hardware associated with said traffic collection operating system of said host processing unit.

5. The method of claim 4, further comprising parsing a kernel command line of said kernel code.

6. The method of claim 5, further comprising activating network interfaces in order to begin collecting traffic from the raw network link via said tap.

7. The method of claim 1, wherein each second level user processing unit comprises:
    a central processor, hard drive, user level tools and scripts, a computer monitor and fixed/removable storage.

8. The method of claim 1, further comprising completing link negotiations before collecting network packets.

9. The method claim 1, further comprising calling a traffic collection mode function to perform the traffic data collection itself.

10. The method of claim 9, further comprising receiving a packet from said raw network link for initial processing by the first level host.

11. The method of claim 10, further comprising time stamping the packet utilizing either said first network interface card or a separate cycle-counter register.

12. The method of claim 11, further comprising sending the packet data asynchronously to said one or more second level user processing units for further analysis, display and storage.

13. The method of claim 10, wherein gathering certain packet information further comprises monitoring any part of the collected traffic for data relating to service type, source/destination addresses, message length, timestamp, TCP/UDP and other internet/ethernet protocol information.

14. The method of claim 10, further comprising buffering any remaining packet data until the packet is full.

15. The method of claim 14, further comprising selecting a channel on the said associated network interface card when the host memory output buffer is full.

16. The method of claim 14, further comprising enqueueing the packet data by said host for sending to said one or more second level user processing units.

17. The method of claim 10, further comprising repeatedly collecting traffic data until an abort signal is received.

18. A system for collecting high-speed network traffic, comprising:
    a plurality of network taps attached in parallel whereby each tap is configured to collect a given subset of the total said network traffic; wherein each tap collects only the discrete stream of traffic associated with said at least one wavelength from said raw network link by splitting said at least one wavelength from the light source within the optical fiber;
    a global NTP clock for synchronizing said plurality of network taps;
    a peripheral PCI bus used to pass collected data from a first network interface card over to a first level host processing unit;
    means for gathering certain packet information from the collected data; and
    at least one accessory PCI bus for transferring the remaining packet data from said host through over an associated network interface card onto dedicated network communication links to one or more second level user processoring units for further analysis, display and storage.

* * * * *